(12) United States Patent
Savguira et al.

(10) Patent No.: US 11,316,794 B1
(45) Date of Patent: Apr. 26, 2022

(54) METHOD AND SYSTEM FOR IMPROVING ADAPTIVE BIT RATE CONTENT AND DATA DELIVERY

(71) Applicant: ZODIAC SYSTEMS, LLC, Hicksville, NY (US)

(72) Inventors: Alexei Savguira, North York (CA); Richard Neill, Garrison, NY (US)

(73) Assignee: ZODIAC SYSTEMS, LLC, Hicksville, NY (US)

( * ) Notice: Subject to any disclaimer, the term of this patent is extended or adjusted under 35 U.S.C. 154(b) by 0 days.

(21) Appl. No.: 17/177,010

(22) Filed: Feb. 16, 2021

Related U.S. Application Data

(60) Provisional application No. 62/965,996, filed on Jan. 26, 2020.

(51) Int. Cl.
*H04L 47/25* (2022.01)
*H04L 67/02* (2022.01)
*H04L 65/61* (2022.01)

(52) U.S. Cl.
CPC .......... *H04L 47/25* (2013.01); *H04L 65/4069* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 2003/0172190 A1* | 9/2003 | Greenblat | H04L 12/4637 709/251 |
| 2006/0206635 A1* | 9/2006 | Alexander | G06F 13/28 710/22 |
| 2012/0254456 A1* | 10/2012 | Visharam | H04N 21/2343 709/231 |
| 2013/0163430 A1* | 6/2013 | Gell | H04L 47/11 370/235 |
| 2015/0052236 A1* | 2/2015 | Friedrich | H04L 43/08 709/224 |
| 2017/0279830 A1* | 9/2017 | Mermoud | A61K 9/0073 |
| 2020/0077161 A1* | 3/2020 | Loh | H04L 65/602 |

* cited by examiner

*Primary Examiner* — Davoud A Zand
(74) *Attorney, Agent, or Firm* — Lawrence G. Fridman, Esq; Feigin & Fridman, LLC

(57) ABSTRACT

A system is provided for improving functionality and performance of ABR framework, so as to preemptively compensate for additional latencies arising as result of having an additional control channel associated with ABR Control Engine which runs as a standalone entity separated physically or logically from ABR Media Player running on a Consumer device. The system comprises a set of software and/or hardware-based components implementing ABR Fetch-Processor or functionally similar design, wherein the ABR Fetch-Processor provided as the software or hardware component is plugged in between Media Pipeline of the Consumer Device and distributed embodiment of the ABR framework.

6 Claims, 6 Drawing Sheets

METHOD AND SYSTEM FOR IMPROVING ADAPTIVE BIT RATE CONTENT AND DATA DELIVERY

CROSS-REFERENCE TO RELATED APPLICATION

The present application claims priority of Provisional patent application Ser. No. 62/965,996 filed by the Applicant on Jan. 26, 2020 the entire disclosure of this application is hereby incorporated by reference.

FIELD OF THE INVENTION

The invention relates to the field of data and content streaming and delivery systems.

BACKGROUND OF THE INVENTION

Adaptive bitrate streaming or ABR is a method of video streaming over HTTP where the source media content is encoded at multiple bit rates. Each of the different bit rate streams are segmented into small multi-second parts. First, the client downloads a manifest file that describes the available stream segments and their respective bit rates, such description is also known as specific representation. During stream start-up, the client usually requests the segments from the lowest bit rate stream. Further choice of the appropriate representation depends on the available network throughput. An adaptive bitrate (ABR) algorithm in the client performs the key function of deciding which bit rate segments to download, based on the current state of the network. Several types of ABR algorithms are in commercial use: throughput-based algorithms use the throughput achieved in recent prior downloads for decision-making, buffer-based algorithms use only the client's current buffer level, and hybrid algorithms combine both types of information. One with ordinary skills in the art will notice significant benefit of the ABR algorithm which allows uninterrupted playback of the streaming media even on the networks where throughput or bandwidth allocation is not guaranteed.

Typical ABR player consists of the plurality of elements including ABR engine responsible for making ABR representation decisions, ABR session context containing state information of the current ABR stream and current network conditions, HTTP downloader responsible for downloading media segments and stream manifest, and Stream Parser responsible for parsing the manifest. ABR Session is leveraging media segments downloaded into ABR cache to form media transport stream and feed it into ABR Demux (demultiplexer), which in turn produces video and audio MPEG Packetized Elementary Streams fed into media pipeline for presentation on the screen.

Adaptive bitrate streaming or ABR is a method of video streaming over HTTP where the source media content is encoded at multiple bit rates. Each of the different bit rate streams are segmented into small multi-second parts. First, the client downloads a manifest file that describes the available stream segments and their respective bit rates, such description is also known as specific representation. During stream start-up, the client usually requests the segments from the lowest bit rate stream. Further choice of the appropriate representation depends on the available network throughput. An adaptive bitrate (ABR) algorithm in the client performs the key function of deciding which bit rate segments to download, based on the current state of the network. Several types of ABR algorithms are in commercial use: throughput-based algorithms use the throughput achieved in recent prior downloads for decision-making, buffer-based algorithms use only the client's current buffer level, and hybrid algorithms combine both types of information. One with ordinary skills in the art will notice significant benefit of the ABR algorithm which allows uninterrupted playback of the streaming media even on the networks where throughput or bandwidth allocation is not guaranteed.

Typical ABR player consists of the plurality of elements including ABR engine responsible for making ABR representation decisions, ABR session context containing state information of the current ABR stream and current network conditions, HTTP downloader responsible for downloading media segments and stream manifest, and Stream Parser responsible for parsing the manifest. ABR Session is leveraging media segments downloaded into ABR cache to form media transport stream and feed it into ABR Demux (demultiplexer), which in turn produces video and audio MPEG Packetized Elementary Streams fed into media pipeline for presentation on the screen attached to a consumer device (e.g., Set Top Box (STB), Mobile Phone, Smart-TV as a subset of possible examples). Typical representation of the ABR player is illustrated in FIG. 1.

Other embodiments of the ABR player exist where components of the ABR player are split into multiple tiers. One embodiment of such split ABR framework is illustrated in FIG. 2. One skilled in art may appreciate the flexibility of such embodiment, which allows hosting of the ABR engine decision logic in a logically separate component, potentially as part of the separate application running in a virtualized container environment, which does not necessarily share the technology with the rest of the ABR player components residing on the consumer device. Some embodiments of the split ABR player apparatus may have ABR Session, ABR Engine, HTTP downloader and Manifest Parser residing in a virtual container residing on a public or private cloud, other may have said components residing on the on premises or external media gateway, yet another embodiments may have said components residing in a separate instance of the virtual machine running on the same customer premises equipment. One skilled in the art may envision multiple use cases where such split ABR player design may prove useful for the purposes of combining ABR player components otherwise incompatible due to different software development technology, for the purposes or re-streaming and others.

One with ordinary skills in the art may however notice that split ABR player design may face additional challenges due to introduction of the additional messaging channel between ABR control engine running in a separate container and ABR Media Player. This messaging channel may introduce undesirable latencies in the ABR control messaging propagation and belated ABR representation change decisions.

The present invention is aimed at improving reliability, performance, and quality of the end user-experience of the distributed ABR design in such embodiments where ABR Engine or ABR Session context are separated from the edge ABR player components by leveraging video decoder buffer watermark signaling to proactively inform ABR engine before video decoder underrun condition occurs and hint switching to a different ABR representation in order to optimize the performance and quality of the user-experience.

SUMMARY OF THE INVENTION

The invention described herein provides methods and systems for improving the operation, performance, or quality of the content in terms of content fidelity, delivery latency, ease of interactivity, quality of user experience; and one or more metrics defined herein. Specifically, the invention entails augmentation of the distributed ABR implementations described above to utilize the invention method and implementation whereby the invention method is implemented as an intelligent ABR pre-fetch processor. The ABR/VBR pre-fetch processor utilizes telemetry metrics as provided by an underlying video decoder buffer hardware platform to compute based on configurable rules, an event, a data or telemetry value, or through predictive-based methods to intelligently and proactively generate the optimal set of requests, flow-control processes, and memory buffers within or across any components comprising distributed ABR framework.

BRIEF DESCRIPTION OF THE DRAWINGS

The drawings discussed below are provided to illustrate and not to limit the invention, wherein:

FIGS. 3, 3A and 3B are diagrams illustrating full componentry of the present invention.

DETAILED DESCRIPTION OF THE INVENTED TECHNOLOGY

Definitions

Figure 1:
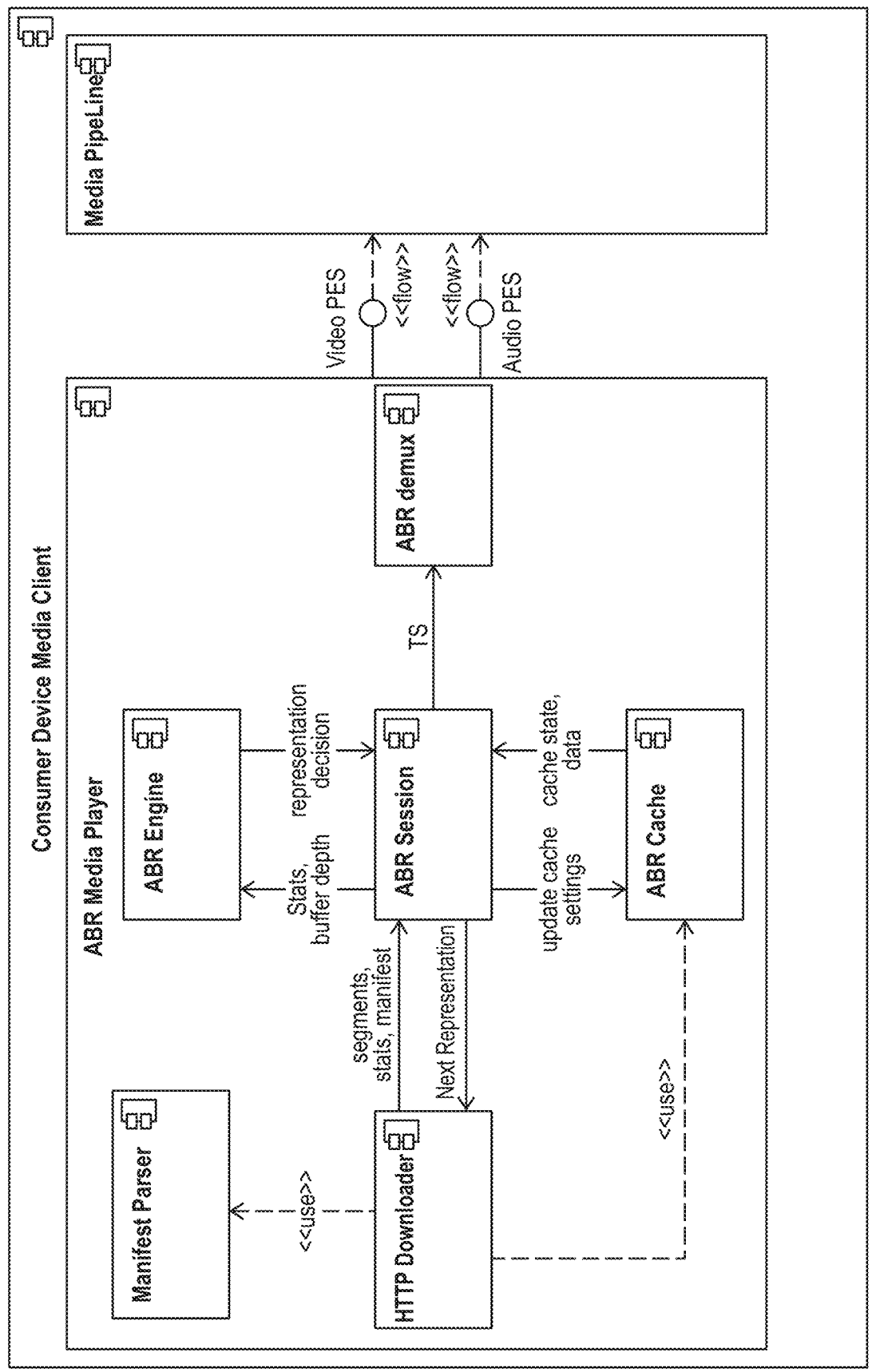
FIG. 1 is a simplified diagram of the general architecture ABR framework componentry.

This section provides definitions of terms used to describe the invention. The terms defined here may not necessarily match definitions of the same or similar entities elsewhere.

Video (a content video) refers to a movie, program, sporting event, stream, etc. that constitutes the video that is specifically selected by the consumer.

Adaptive Bitrate Streaming is a method of video streaming over HTTP where the source content is encoded at multiple bit rates. Each of the different bit rate streams are segmented into small multi-second parts.

System refers to a subject matter of the present invention.

Consumer Device is a device used or accessible to a consumer to watch content video. An example of the Consumer Device is Set Top Box referred herein as STB. Other Consumer Devices include, but not limited to, Mobile Phone, Tablet, or Smart-TV.

CDN (Content Distribution Network) refers to an IP based network element that is used for storing and caching of video or ad media assets for efficient retrieval.

ABR Engine is a core component of the ABR framework responsible for making next ABR representation decision.

ABR Representation—combination of the streaming media or rate of the delivery is also referred herein as bit-rate, and the size of the content which may be expressed in terms of a resolution figure as a one definition type.

Packetized Elementary Stream (PES)—refers to Packetized Elementary Stream (PES) is a specification in the MPEG-2 Part 1 standard that defines carrying of elementary streams (usually the output of an audio or video encoder) in packets within MPEG program streams and MPEG transport streams. The elementary stream is packetized by encapsulating sequential data bytes from the elementary stream inside PES packet headers.

ABR Session—context of the given ABR streaming session which may consist of current stream, position, chosen representation, state of the ABR Cache buffers as a one definition type. ABR session components may also reassemble continuous MPEG transport stream from the multiplicity of ABR media segments extracted from the ABR Cache.

ABR Cache—is a finite memory buffer allocated to temporarily store downloaded segments of the ABR streaming media.

ABR Demux—here demultiplexer component responsible for disassembling MPEG transport stream segments into Packetized Elementary Streams.

ABR Edge Proxy Client—client receiving URL's of the next ABR Media segments to download from ABR Control Proxy and using HTTP downloader to fill ABR Cache. ABR Edge Proxy client receives historical network bandwidth statistics from HTTP downloader and ABR Cache state information from ABR Cache. In a distributed embodiment of the ABR framework ABR Edge Proxy Client components may also reassemble continuous MPEG transport stream from the multiplicity of ABR media segments extracted from the ABR Cache.

ABR Segment—short (usually few seconds long) segment of MPEG media defined in certain ABR representation.

ABR Control Proxy—proxy intermediary designed to pass media segment URL's to ABR Edge Proxy Client and to pass ABR cache and network statistics back to ABR Engine in a distributed embodiment of the ABR framework.

ABR Manifest—refers to a filed on CDN referencing available ABR representations of URL's of the ABR segments along with the other ABR metadata describing ABR stream.

Configurable Rule refers to a software component (part of the present invention) that carries a specific type of functionality to be executed by Pre-Fetch Rule Engine or Message translator. Configurable rule can perform any metadata transformation or implement any logical function to facilitate the decision to be made by Pre-Fetch Rule Engine. Configurable Rules are dynamic in nature, which constitutes an important part of the present invention, and in one embodiment of the present invention may be provided or updated by an external server component such as Matrix componentry developed by Zodiac Systems, or any other $3^{rd}$ party componentry. In other embodiment of the present invention Configurable Rules may be dynamically updated locally on the consumer device itself due to environmental or any other internal or external factors. Configurable Rules are dynamic in nature, which constitutes an important part of the present invention, and in one embodiment of the present invention may be provided or updated by an external server component such as Matrix componentry developed by Zodiac Systems, or any other $3^{rd}$ party server componentry. In other embodiment of the present invention Configurable Rules may be dynamically updated locally on the consumer device itself due to environmental or any other internal or external factors.

Manifest Parser—refers to a software component capable of parsing ABR manifest for extraction of the next ABR segment URL instruction.

ABR Control Engine—refers to a plurality of the ABR componentry implementing core ABR decision logic, ABR Session handling and ABR manifest parsing functionality in a distributed embodiment of the ABR framework.

Message Translator—is a core component of the present invention and part of the Pre-Fetch Processor responsible for generation and translation of the ABR pre-fetch control messaging providing interface into ABR Edge Proxy Client in a distributed embodiment of the ABR Framework.

Pre-Fetch Rule Engine refers to a software component which is essential part of the present invention. Pre-Fetch Rule Engine is capable of execution of multiplicity of daisy-chained Configurable Rules to reach defined logical decision based on analysis of the state of multiplicity of the buffers provided by the underlying hardware platform (e.g., PES Video Buffer, PES Audio Buffer, Video Decoder Buffer)

Sync Clock—refers to a precision timer-based Platform component responsible for synchronization of the audio and video PES.

DRM (EME/CDM)—refers to optional Digital Rights Management conditional access and media decryption component which may optionally include Encryption Media Extensions via Content Decryption Module. This component is optional and is not part of the present invention and is not therefore disclosed any further.

Decoder Buffer—refers to finite physical memory allocated to feed Video Decoder.

Decoder—refers to a hardware component responsible for decoding incoming MPEG media stream and passing results into presentation devices (e.g., Audio Output and Video Window).

Audio Output—refers to a hardware component which produces digital or analog audio signal output for consumption by the customer.

Video Window—refers to part of the screen or in a particular use case to an entire screen used by the customer for watching video presentation.

MPEG Transport stream—refers to a standard digital container format for transmission and storage of audio, video, and Program and System Information Protocol.

GOP—refers to a group of pictures, or GOP structure, specifies the order in which intra- and inter-frames are arranged. The GOP is a collection of successive pictures within a coded video stream. Each coded video stream consists of successive GOPs, from which the visible frames are generated. Encountering a new GOP in a compressed video stream means that the decoder does not need any previous frames in order to decode the next ones, and allows fast seeking through the video.

Media Buffer Watchdog—represents a core component of the present invention whose function is monitoring plurality of the media buffers (e.g., Video PES buffer, Audio PES buffer, Decoder Buffer), collect buffer state information in accordance with the buffer high and low watermarks defined in a set of configuration rules and triggering an event passed to Pre-fetch Rules Engine and, subsequently to the message translator for yet subsequent reporting to ABR Edge Proxy Client.

DETAILED DESCRIPTION OF THE EMBODIMENTS OF THE INVENTION

It has been indicated above the current methods for content and data delivery, also known as content or data streaming entail the use of multiple methods. On the network where available bandwidth and throughput is not guaranteed, delivery is typically based on the Internet methods such as HTTP and Adaptive-Bit-Rate (ABR) mechanisms. Methods of designing the system for HTTP and ABR streaming delivery may be implemented within a single system or distributed across multiple systems in any combinations of logical, virtual or physical realizations. It will be discussed below that the invention discloses the methods and systems for improving the operation, reliability and performance of ABR delivery in embodiments where components of ABR mechanism are distributed across multiple systems, in order to achieve optimal content or data delivery and end user experience.

Reference is made to FIG. 1, which is a simplified diagram of the monolith typical embodiment of the ABR framework player. Presented diagram representing a typical design of the monolith ABR player, is provided for reference only and does not constitute part of the present invention. One with ordinary skills in the art may find a description of the presented components in the Definitions section.

Figure 2:
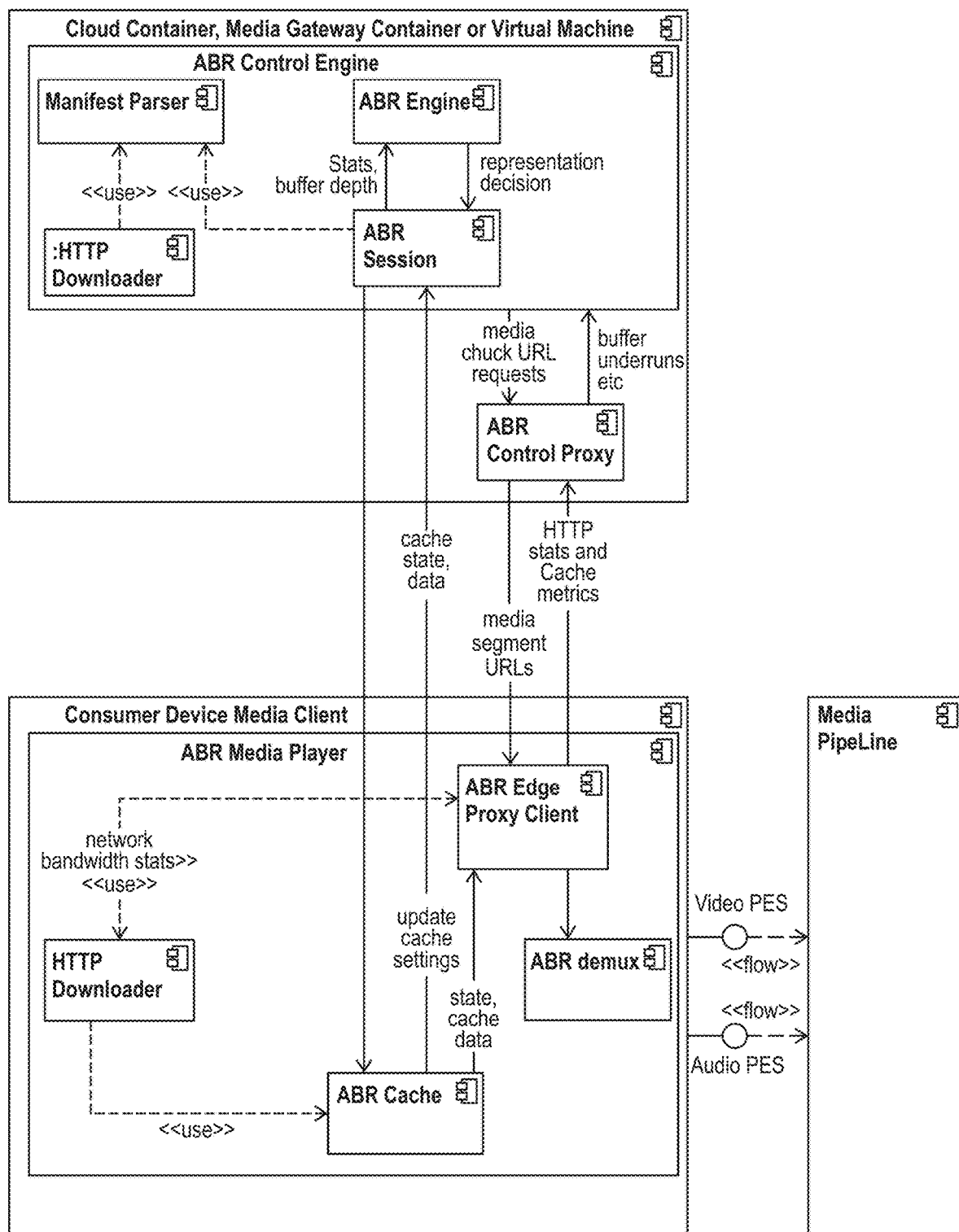
FIG. 2 is a simplified diagram of one embodiment of the ABR framework componentry.

Reference is made to FIG. 2, which is a simplified diagram illustrating one embodiment of the ABR framework. This embodiment of the ABR Framework represents prior art, which is provided for reference only and does not constitute a part of the present invention. The present invention is designed to improve functionality of this or similar distributed embodiments of the ABR framework. The description of the componentry of such ABR framework architecture is provided in the Definitions section.

Figure 3A:
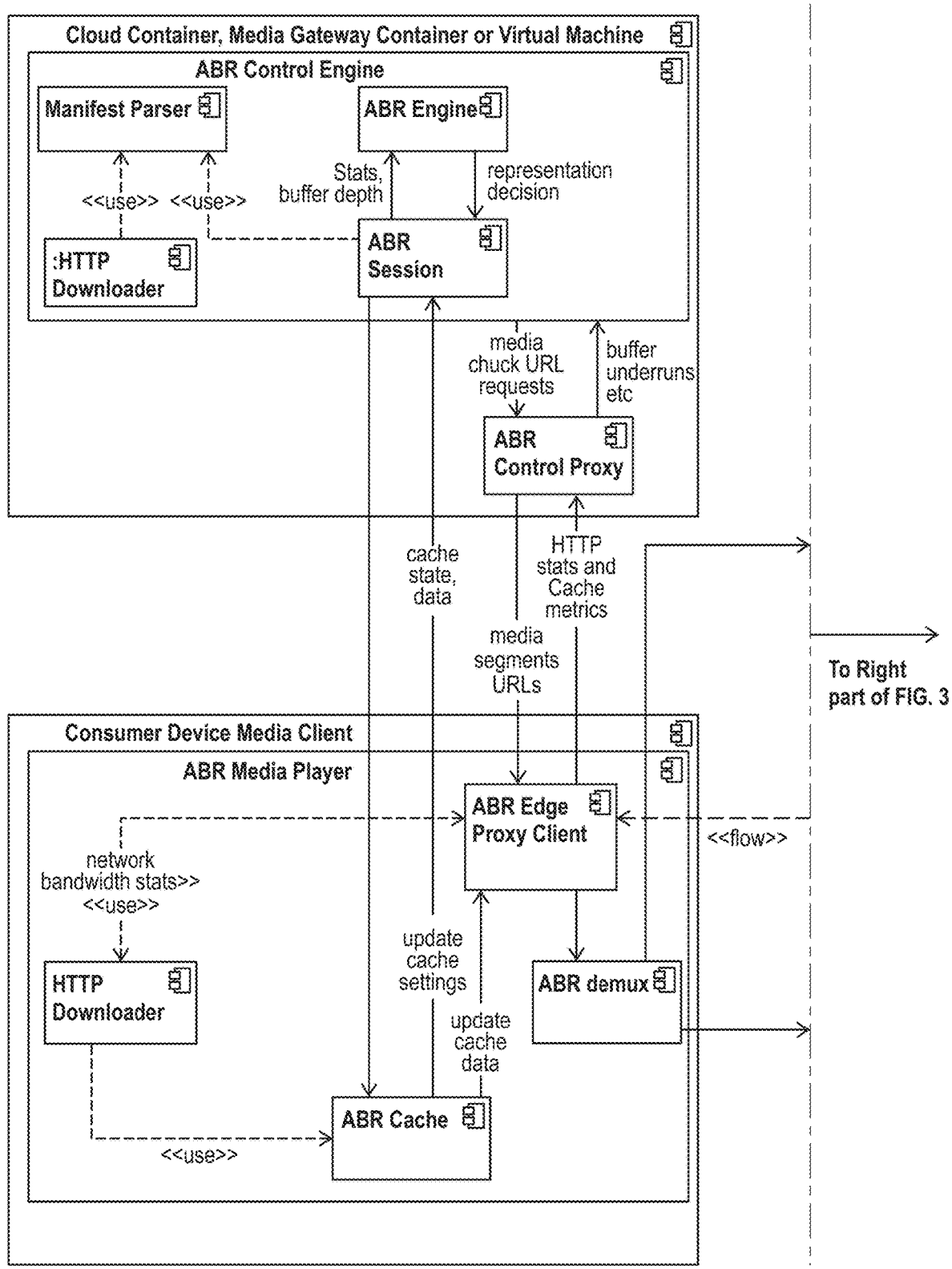
Figure 3B:
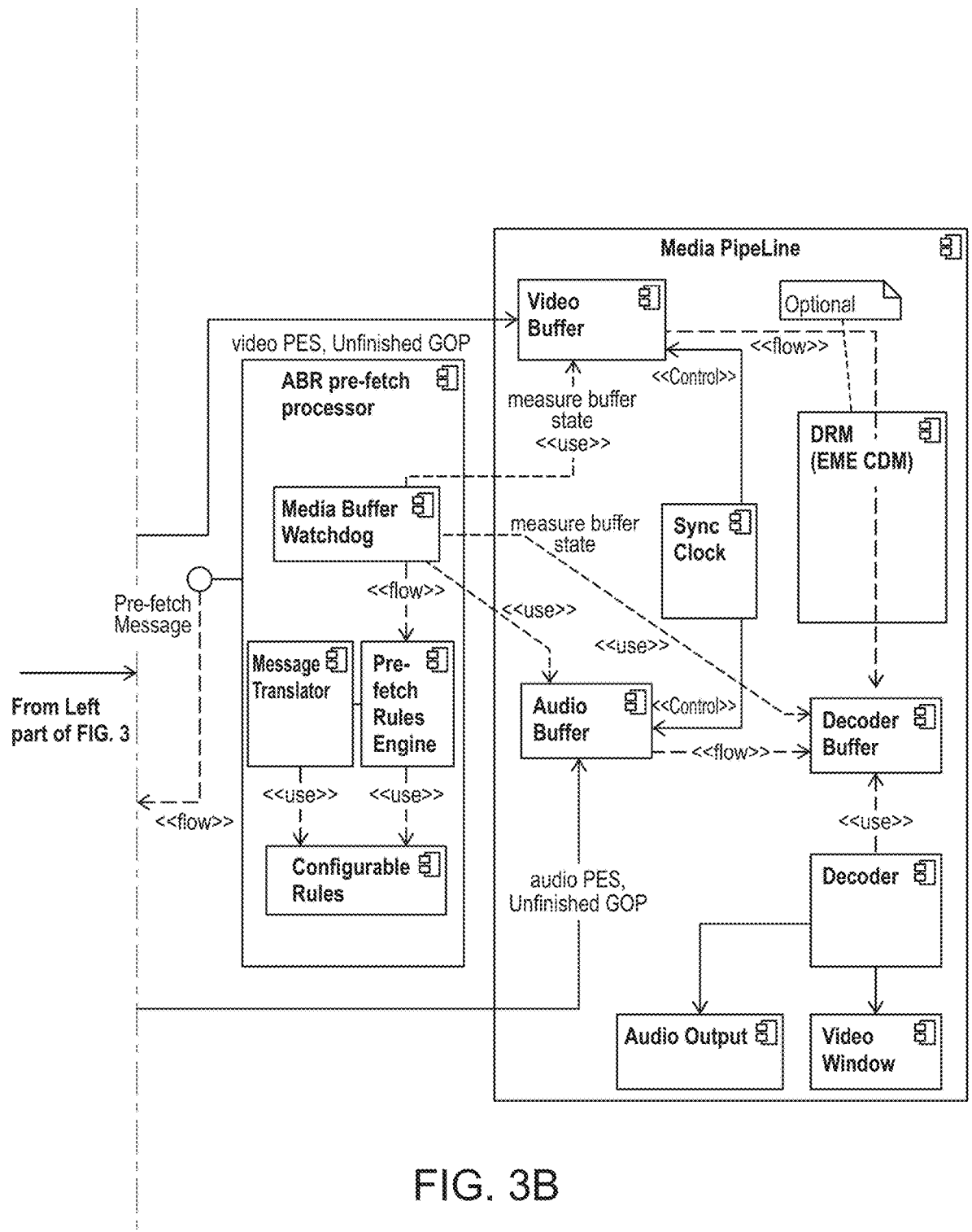

Reference is made to FIGS. 3, 3A and 3B which illustrate the detailed architecture of the present invention.

The system comprising the present invention in one embodiment consists of the distributed embodiment of the ABR Framework as presented on the left and right sides of FIGS. 3A and 3B (also compare to the conceptual diagram of distributed ABR embodiment presented in FIG. 1). ABR Media Player situated on a consumer device (which is logically separated from the ABR Control Engine running in a virtualized container, situated on a private or public Internet cloud, local or external media gateway, separate virtual machine or any other separate environment) is plugged into Video Pipeline also situated on a Consumer device and hosting among other componentry multiplicity of low-level platform buffers (e.g., Decoder Buffer, Audio PES buffer, Video PES buffer).

ABR Prefetch Processor is a core component of the present invention and represents a set of software components and configurable rules plugged in between Video Pipeline and Consumer Device ABR Media Player.

The ABR Prefetch Processor implements intelligent signaling which is responsible for carrying out the following tasks:

- Constant Monitoring by Media Buffer Watchdog of plurality of the buffers provided by the underlying hardware platform in accordance to the defined in configurable rules low and high watermarks.
- On reaching certain condition determined by execution of a set of Configurable Rules executed by Pre-Fetch Rules Engine triggering generation of the ABR Pre-Fetch Message by Message Translator which exposes or otherwise transmits said message to ABR Edge Proxy Client.
- The ABR Pre-Fetch message is based on the state of the underlying platform buffers is located lower in the software and hardware stack layer than state of the ABR Cache buffer or historical network statistical data available from HTTP Downloader which retrieved ABR media segments. Hence, ABR Pre-Fetch message provides pre-emptive information which allows more precise and early control to hint ABR Engine, running in a logically separated virtual container, to preemptively switch ABR representation in accordance to the volatile network and buffer conditions.

In one embodiment of the present invention Message Translator and Pre-Fetch Rules Engine may take into account not only buffer state but also compensate for the historically observed messaging latencies on the upstream control channel between ABR Edge Proxy Client and ABR Control Proxy, which runs in a logically separated container.

Messaging mechanism for transmission of the historically observed latencies on the upstream control channel between ABR Edge Proxy Client and ABR Control Proxy may vary from embodiment to embodiment, and present invention does not restrict the messaging transport. In one embodiment of the present invention such information will be encapsulated in packetized elementary stream PES headers.

In other embodiments of the present invention Message translator may expose to the ABR Edge Proxy client spoofed network bandwidth stats identical to those used by HTTP Downloader and/or spoofed ABR Cache stats used by the respective ABR Cache component. One skilled in the art may appreciate this important aspect of such embodiment of the present invention as it allows desired optimization without the need to modify existing HTTP Downloader or ABR Cache component or their respective control mechanisms.

Figure 4:
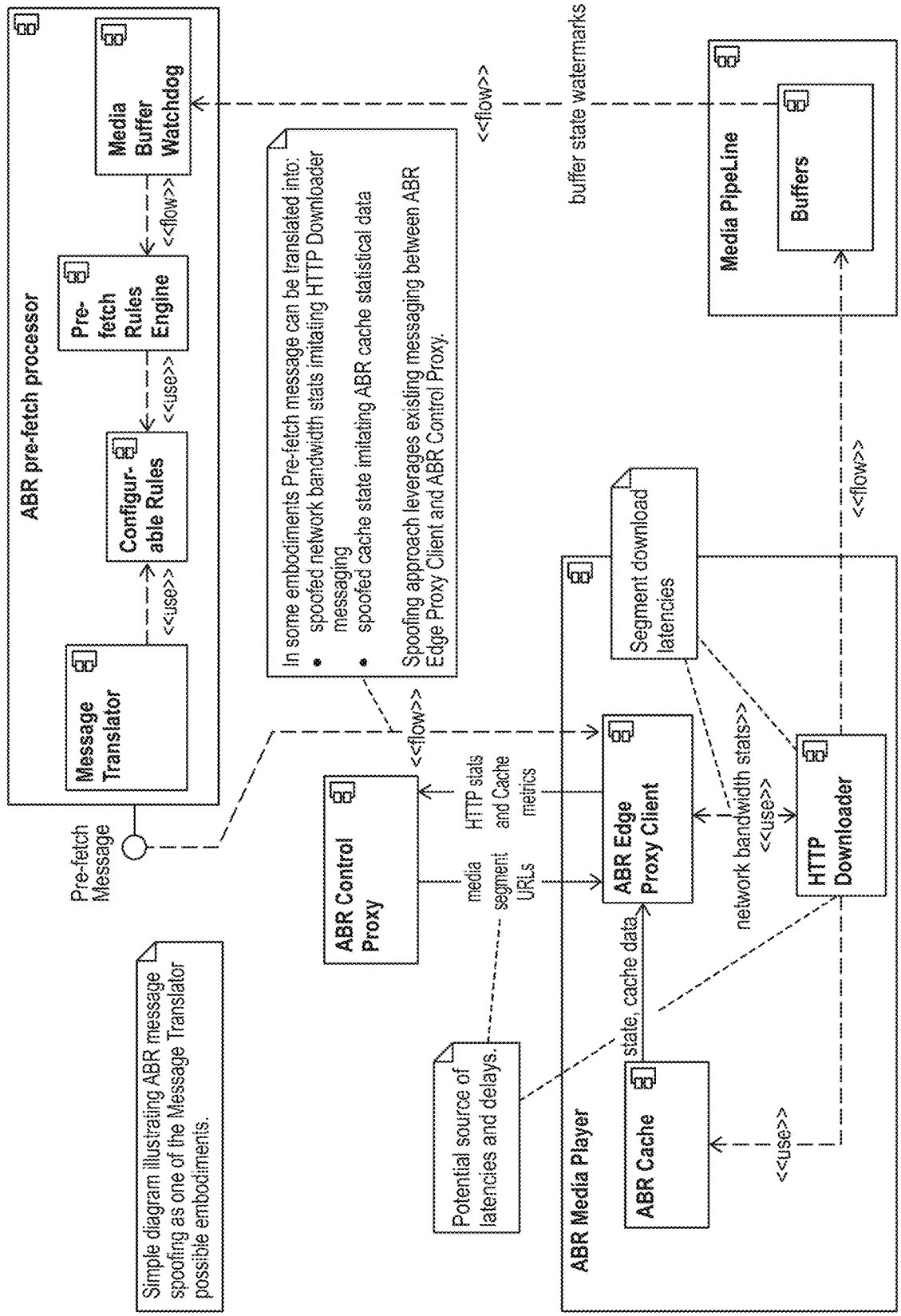
FIG. 4 is a diagram illustrating usage of the ABR Fetch-Processor and Message Translator to spoof existing HTTP Downloader and ABR Cache Statistics.

Reference is made to FIG. 4 which represents concepts and functionality of the above-discussed ABR Prefetch Processor in a simplified form. In addition, FIG. 4 also illustrates possible sources of the network latencies arising both from latencies of the HTTP segments download and from the latencies of the control channel between ABR Edge Proxy Client and ABR Control Proxy.

Figure 5:
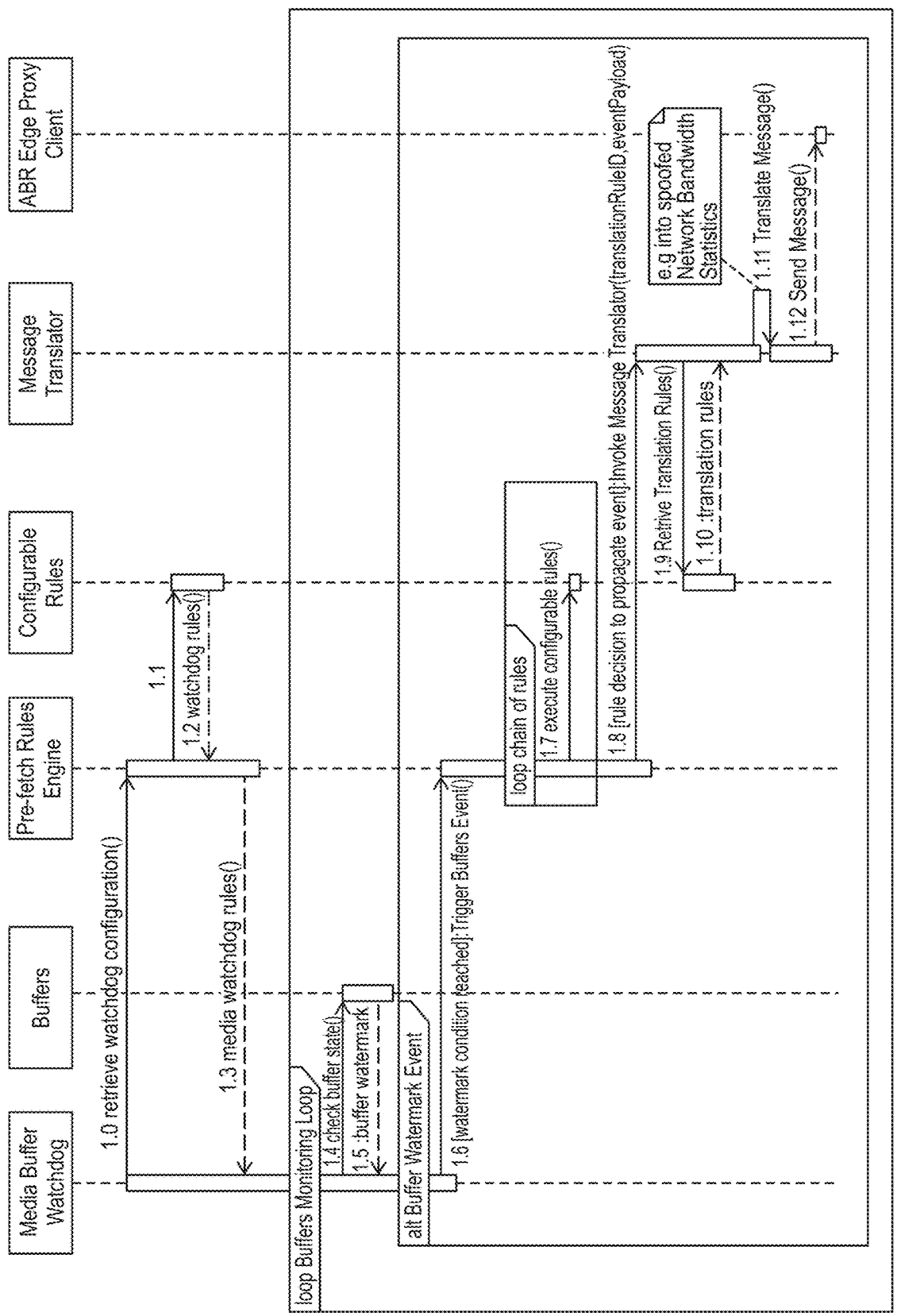
FIG. 5 is a behavioral sequence diagram illustrating operation of the system of invention.

Reference is made to FIG. 5 which is a diagram representing a flow of operational steps in the method of the present invention. In the step 1.0 to 1.3 Media Buffer Watchdog retrieves its respective configuration via Pre-Fetch rules engine, which in turns consults a set of Configurable Rules to construct an up-to-date buffer watermark monitoring rules.

Steps 1.0 to 1.12 represent main Monitoring loop initiated by Media Buffer Watchdog component. Steps are executed repeatedly for the lifecycle of the ABR Session operation.

In steps 1.4 and 1.5 Media Buffer Watchdog collects buffer state information from the plurality of the Media Buffers (e.g., Video PES buffer, Audio PES buffer and Video Decoder buffer). Media buffers represent a part of the underlying hardware platform functionality.

Upon reaching Media Buffer condition specified in the dynamically updatable Configuration Rules, Media Buffer Event is triggered in step 1.6 and Media Buffer Watchdog passes Control to Pre-Fetch Rules Engine.

In step 1.7 Pre-Fetch Rules Engine executes a chain of the Configurable Rules which results in decision whether to propagate the Media Buffer Event upstream, as well as in decision what translation rules to apply while exposing said event upstream.

In step 1.8 Message Translator is invoked.

In steps 1.9-1.10 Message Translator retrieves set of Configurable Rules referenced by the translation Rules ID passed by Pre-Fetch Rules Engine.

In step 1.11 Message Translator performs message transformation into desired format (e.g., into spoofed network bandwidth statistics in a format natively supported by ABR Edge Proxy Client).

In Step 1.12 Message Translator sends transformed message upstream to ABR Edge Proxy Client.

The method and system for improving adaptive bit rate content and data delivery have been described with some degree of particularity directed to the exemplary embodiments of the present invention. It should be appreciated, though, that the present invention is defined by the following claims construed to be patentable over the prior art, so that it should be obvious to a skilled person that modifications or changes may be made to these embodiments of the present invention without departing from the inventive concepts contained herein.

What is claimed is:

1. The system for improving functionality and performance of ABR framework to preemptively compensate for additional latencies arising as result of having additional control channel associated with Adaptive Bit Rate (ABR) Control Engine which runs as a standalone entity separated physically or logically from the ABR Media Player running on a Consumer device, said system comprising:

a set of software and/or hardware-based components implementing ABR Fetch-Processor or functionally similar design, said ABR Fetch-Processor being plugged in between Media Pipeline of the Consumer Device and distributed embodiment of the ABR framework, wherein said ABR Fetch-Processor is the software or hardware component comprising:

a) Media Buffers Watchdog performing continuous buffer monitoring function on the plurality of the platform provided media buffers and capable of the generation of the Media Buffers watermark event;

b) Pre-Fetch Rules Engine as software component capable of a daisy chained execution of the flexible dynamically configurable rules and externally updatable or internally generated Configurable Rules, said Pre-Fetch Rules Engine is also capable of receiving statistical information about latencies arising on additional upstream control channel between logically or physically separated ABR Control Engine and ABR Media Player, said statistical information being repeatedly transmitted in PES headers or by any other means, said Pre-Fetch Rules Engine is also capable of invocation of the Message Translator; and c) Message Translator capable of performing translation of the Media Buffer Watermark event payload into any format natively supported by the ABR Media Player componentry, which is external to the system of the invention, said translation including but not limited to spoofing of the messaging protocols natively used by ABR Player HTTP Downloader and/or ABR Cache componentry or other functionally similar components.

2. A method for preemptive compensation of additional latencies arising in a distributed ABR framework by leveraging the following steps:

additional continuous or periodic monitoring of at least one Media Buffer provided by the underlying platform hardware by Media Buffer Watchdog;

wherein at least one Configurable Rule is supported by Pre-Fetch Rules Engine to capture media buffer state triggered event;

wherein at least one Configurable Rule for translation of the said event into a format natively supported by ABR Player componentry, which is external to the method of the invention or into any other format used for integration of the said ABR Player into Media Pipeline; and supporting an ability to dynamically externally update or internally generate the set of Configurable Rules for processing by Pre-Fetch Rules Engine.

3. The method of claim 2, further comprising the step associated with the ability to spoof network bandwidth statistics as collected by HTTP downloader being part of the consumer device running componentry the distributed embodiment of the ABR framework.

4. The method of claim 3, further comprising the step associated with the ability to spoof ABR Cache state messages as reported by ABR Cache of the consumer device running componentry of the distributed embodiment of the ABR framework.

5. The method of claim 4, further comprising the step associated with the ability to collect and process historical latency statistics observed on the control channel between ABR Control Engine which runs as a standalone entity separated physically or logically from the ABR Media Player running on the Consumer device, said historical statistics transmitted in PES headers or by any other means.

6. The method of claim 5, further comprising the step associated with the ability to translate obtained said historical statistical data into adjusted ABR messaging designed to compensate for said additional latencies, said adjusted ABR messaging then being passed to ABR Edge Proxy Client or functionally similar component for subsequent passing to logically or physically separate ABR Control Proxy or any functionally similar component and said adjusted ABR messaging then used to tune the logic of the ABR representation decision as implemented by ABR Engine or any functionally similar component.

* * * * *